Oct. 25, 1932.  R. M. HARRIS  1,883,900
HEADER JOINT
Filed May 7, 1930   2 Sheets-Sheet 1
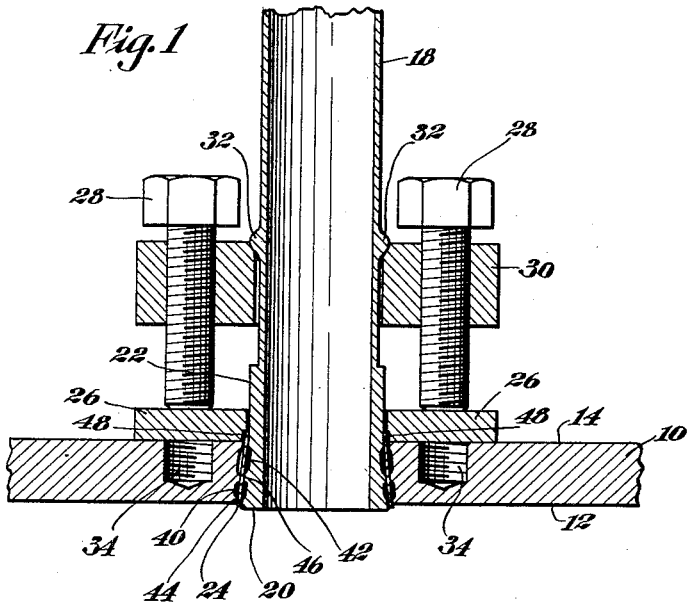
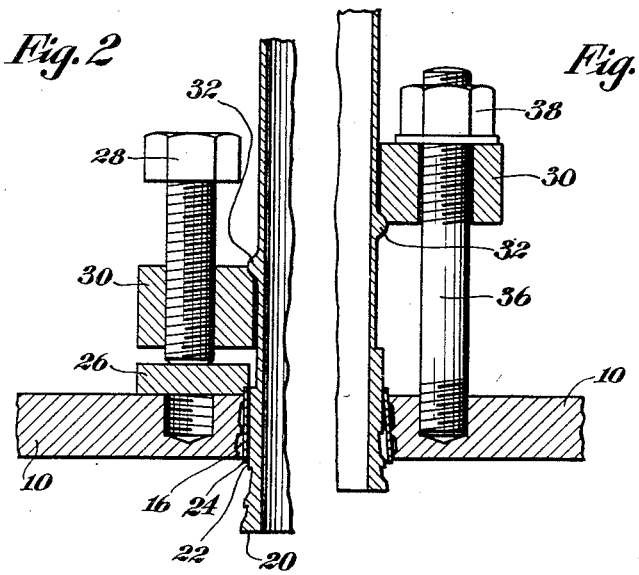
INVENTOR
Reginald M. Harris.
BY
ATTORNEY Oct. 25, 1932.   R. M. HARRIS   1,883,900
HEADER JOINT
Filed May 7, 1930   2 Sheets-Sheet 2
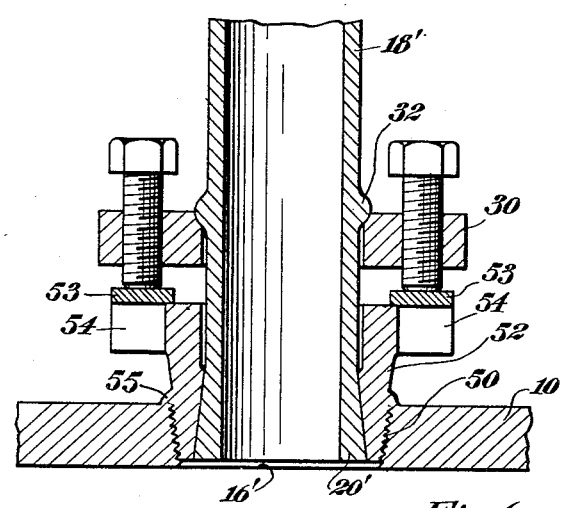
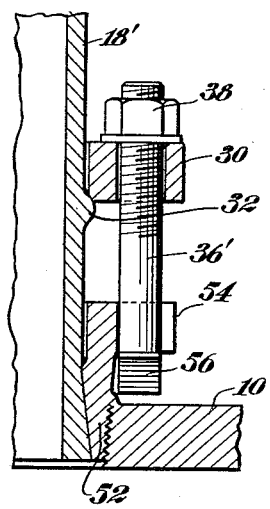
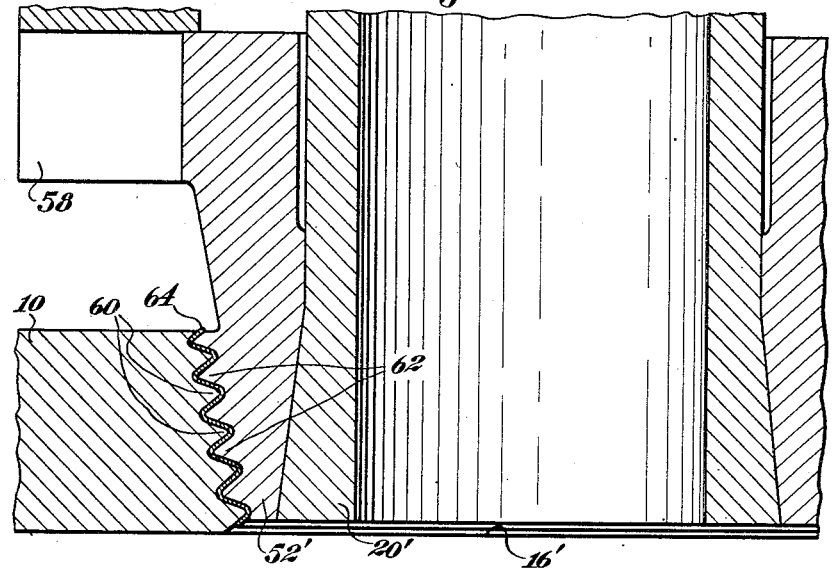
INVENTOR
Reginald M. Harris
BY
O. V. Thiele
ATTORNEY Patented Oct. 25, 1932

1,883,900

UNITED STATES PATENT OFFICE

REGINALD M. HARRIS, OF FANWOOD, NEW JERSEY, ASSIGNOR TO THE SUPERHEATER COMPANY, OF NEW YORK, N. Y.

HEADER JOINT

Application filed May 7, 1930. Serial No. 450,572.

My invention relates to joints between tubular members and aims to provide an arrangement in which the effect of internal fluid pressure increases the mechanical pressure between the members forming the joint so as to reduce the tendency to leakage.

The novel features of my invention will be pointed out with particularity in the appended claims, but in order that my invention may be clearly understood I will now describe in detail and in connection with the accompanying drawings several forms of joint each of which embodies my invention.

In the drawings

Fig. 1 is a sectional elevation of a joint in accordance with my invention between a tubular unit and a header, and in which the end of the unit is mounted directly in the header.

Fig. 2 is a fragmentary view of the parts illustrated in Fig. 1 as they appear when the joint is about to be formed.

Fig. 3 is a fragmentary sectional elevation of the parts illustrated in Fig. 1 as they appear after the joint has been made and broken.

Fig. 4 is a sectional elevation through a joint in accordance with my invention in which the tubular unit is supported on the header indirectly, the parts being illustrated in the position occupied when the joint is under pressure.

Fig. 5 is a fragmentary sectional view of the tubular unit and header shown in Fig. 4 with means for breaking the joint.

Fig. 6 is a sectional elevation on an enlarged scale of a joint of the type shown in Fig. 4, but in which a gasket is interposed between the header and the member supporting the end of the unit.

Fig. 7 is a sectional elevation of a gasket of the type shown in Fig. 6.

The joints disclosed herein are illustrated as designed especially for connecting tubular units to headers, but it will be understood that my invention is not limited to such use. The forms of header joints now in most common use are the rolled joint, and the ball and socket joint in which a ball on the end of the tubular unit is forced against a socket in the header. The rolled joint is difficult to remove in case of a leak and also it necessitates hand holes in the header in the wall opposite the joint for the tubular units in order that the ends of the tubes may be rolled into place. Such hand holes require means for closing them which are themselves subject to leakage, and the rolled joints are difficult to replace. The ball and socket joint needs to be made with great care when used for high fluid pressures because the pressure tends to force the unit away from the seat so that, unless the parts fit perfectly, leaks develop when the pressure is first turned on which cut the seats of the joints. The joints within the present invention are so formed and the parts so arranged that, although the tube end may be moved axially to break the joint when desired, any movement of the tube or expansion thereof due to internal fluid pressure tends to tighten the joint so as to prevent leakage.

In the arrangement illustrated in Figs. 1, 2 and 3, a header wall 10 is shown having an inner face 12 subject to fluid pressure, and an outer face 14 exposed to atmosphere. Wall 10 has a series of apertures therein one of which is illustrated at 16 and each of which contains the end of a tubular unit such as 18. The aperture 16 is shown as flaring inwardly so that its diameter on the surface 14 is less than that at the surface 12. The inner end 20 of tube 18, however, flares inwardly so that its diameter at the point normally adjacent to the surface 14 has a less diameter than the inner end of the tube, the slope of the surface of the aperture being complemental to that of the surface of the tube opposite it. However, in order that the end of the tube may be inserted into the aperture 16, its inner end 20 has a diameter slightly less than that of the diameter of the aperture 16 at the outer surface of the wall 10. The end 20 may, therefore, be inserted through the aperture 16 and into the interior of the header into the position shown in Fig. 2 so that a cylindrical portion 22 of the tube 18 which has a less diameter than the end 20 lies within the aperture 16. When the parts are in this position there is sufficient space between the wall 10 and the outer surface of the portion 22 to permit insertion into the aperture 16 of a sleeve gasket 24 which has been placed around the tube 18 before the end 20 is upset to increase its diameter. In order to make the joint, it is then necessary to draw the tube outwardly again to expand the gasket 24 and to wedge it between the face of the aperture 16 and the flared-out portion of the tube end to form a fluid tight joint. To hold the gasket 24 while being expanded, I provide plates 26, 26 which have half-round recesses therein of the same radius as the surface 22 on tube 18 and which, when in use are fitted around the portion 22 so as to bear against the upper edge of the gasket 24. The tube 18 is then drawn outwardly to expand the gasket and the parts are so proportioned and arranged that such movement of the tube expands gasket 24 between the wall of aperture 16 and the flared surface of the end of tube 18 so as to wedge the parts together and make a fluid tight joint. For moving the tube 18 axially as just described to expand the gasket 24, I prefer to employ bolts 28, 28 which rest on one end against the plates 26 and which are threaded into a yoke 30, so that when bolts 28, 28 are turned in a given direction, yoke 30 is moved axially of tube 18 and moves the tube with it by contact between the yoke and the annular projection 32 on the outer surface of tube 18. The outer diameter of projection 32 is preferably the same as that of the cylindrical portion 22 so that a cylindrical sleeve gasket 24 may be slipped over it when it is desired to use the gasket in making a joint. In this way, a given tube 18 may have several gaskets 24 placed thereon before the end 20 is upset, thereby permitting the breaking and making of the joint between a given tube and header a number of times before reforging the tube end.

When it is desired to break a joint formed as above described, the yoke 30 is moved from a position shown in Fig. 1 and inverted so as to contact with the other side of the projection 32. The bolts 28 are at the same time removed from the yoke 30 and the plates 26 removed from the surface of the header 14 so as to expose threaded recesses 34, 34 in the header in alinement with the bolt openings in the yoke 30. Threaded bolts such as 26 are then run into the sockets 34 and through the bolt holes in yoke 30, and nuts 38 threaded onto the bolts 36 to force the yoke against the enlargement 32 in the direction to move the end 20 inwardly and break the joint as indicated in Fig. 3.

The joint illustrated in Figs. 1 to 3 inclusive is so arranged that the end of the tube 18 does not contact with the header wall 10 throughout the entire thickness of such wall, the wall and the end of the tube both being cut away at points to provide annular grooves 40 and 42 separated by relatively narrow lands or bearing areas 44 and 46 on the header seat and tube respectively. I do not limit myself, however, to grooving out the seat of the joint or the bearing surface of the tube as either one or both may be continuous throughout. It will be understood also that the lands or areas 44 and 46 are parts of complementally flaring surfaces.

When it is desired to break a joint of the type illustrated in Fig. 1, the gasket 24 must be removed from the aperture 16, as otherwise the enlarged end 20 cannot be withdrawn from the aperture. To facilitate removal of the gasket 24, I prefer to make it longer in its axial dimension than the thickness of the wall 10 so that, when the joint is made it will project somewhat on the outside of the wall 10, as appears clearly in Fig. 1. In order to permit the gasket 24 to project outside the wall 10, the plates 26 may be rabbeted as indicated at 48, 48 to receive the edge of the gasket and at the same time hold it against axial movement while the gasket is being expanded by the movement of the end 20 of the tube 18 during the formation of the joint.

Referring to Figs. 4 and 5, I have therein illustrated a second form of joint within my invention. In the arrangement of Fig. 4 the wall 10 has an aperture 16' therein, the wall of which flares outwardly and is threaded as indicated at 50. The diameter of aperture 16' is large enough so that an inwardly tapered threaded collar 52 may be employed in the aperture 16' and the tube 18' mounted on the collar 52. The joint between the inner end 20' of tube 18' and the collar 52 is of the same general type as the joint described in connection with Fig. 1 in that the tube end 20' flares inwardly and the surface of the collar 52 surrounding the end 20' tapers outwardly at an inclination complemental to that of the outer surface of the end 20' so that end 20' and collar 52 are brought together to form a fluid tight joint therebetween by drawing the tube 18' forcibly outward with respect to the wall 10 and collar 52. It will be understood that, in making the joint illustrated in Fig. 4 the collar 52 is first placed around the end of tube 18' and the end 20' is then upset, forged or machined so as to fit the inner face of the collar 52. The collar may then be screwed into apertures such as 16' and the tube drawn forcibly against the collar to make a tight joint. For forcing tube 18' against the collar an arrangement similar to that in Fig. 1 may be used having a yoke 30 bearing against an enlargement 32 and bolts 28 threaded into the yoke for moving it. In Fig. 4, however, bolts 28 thrust against plates 53, 53 which bridge openings between ears 54, 54 projecting laterally from the outer end of collar 52.

It will be seen that a given tubular element 18' can be readily inserted into an opening in the header 10 and removed therefrom as desired. Furthermore, the joint between the collar and the end of the tube 20' is tightened by pressure in the head 10 which necessarily tends to force the tube 18 out of the header and to expand the tube. There is, of course, a possibility of leakage along the threaded surface 50 at which collar 52 is in contact with wall 10. However, the tapered threaded joint as illustrated in Fig. 4 is well known to give little or no trouble from leakage even against high fluid pressures on account of the strong wedging action between the surfaces of such joints. If desired, the collar 52 may be provided with a lip 55 extending outwardly over the end of the threaded surface 50 at the outer surface of wall 10 and lip 55 may be either welded to the wall or have a gasket between it and the wall to further insure against leakage. Of course, when tube 18' is to be removed from aperture 16', it is necessary to first break the joint between end 20' and collar 52 before the collar can be unscrewed from wall 10. For breaking the joint, the arrangement illustrated in Fig. 5 may be employed. As shown, the yoke 30 is placed on the outside of the projection 32 and bolts 36' having T-heads 56 are arranged with their heads 56 in engagement with the undersides of outstanding ears 54 mentioned above as projecting laterally from the upper end of the collar 52, the bolts extending upwardly between the ears and through the apertures in the yoke 30 so that nuts 38 on the bolts may draw the bolts and tube 18' inwardly to break the joint between it and the collar 52.

The arrangement illustrated in Fig. 6 is similar to that of Figs. 4 and 5 but differs therefrom in that the collar 52' and the co-operating surface of the wall 10 are not formed with ordinary screw threads as in Fig. 4 but with large threads 60, 60 and 62, 62 respectively, each having somewhat rounded tips, and the diameter of the tapered face of the collar 52' is enough smaller than the diameter of the aperture 16' so that a preformed gasket 64 may be threaded into the aperture 16' or onto the collar 52' and the collar thereupon threaded into the aperture. It will be seen that the tapered annular gasket 64 is spun on both its outer and inner surfaces so that it fits both the threads 60 and threads 62. Gasket 64 is illustrated in detail in Fig. 7 and has a frusto-conical shape corrugated externally and internally by helical corrugations having rounded bottoms.

It will be seen that the joints in accordance with the present invention permit the insertion and removal of tubular units from headers without the need of hand holes or openings in the header wall other than those required for the tubes themselves while providing an arrangement whereby the axial movement and/or the expansion of the tubes under high pressure tightens the joint against leakage.

It will be understood also that the arrangements of Figs. 4 and 6 in which threaded collars are placed around the flared ends of the tube elements may have gaskets between the tube ends and the collars, and for this purpose the arrangement of Figs. 1 to 3 may be employed when desired. However, the reduced crushable "lands" disclosed in my application for header joints executed of even date herewith may be employed in the joints of the types illustrated in Figs. 4 and 6 whenever it is thought desirable to do so, but I do not limit myself, insofar as the inventions of Figs. 4 and 6 are concerned, to the use of gaskets or to the use of "land" or other bearing surfaces of relatively small areas.

I claim:

1. The combination of a header having an aperture therein, a tube extending into said aperture and having its inner end of larger diameter than the portion normally adjacent the surface of the header, means forming a fluid tight joint between said tube and header which is so arranged that fluid pressure within the header tends to tighten the joint, and means whereby said tube may be removed from said header in the direction parallel to the position of the tube when in use.

2. The combination of a header having an aperture therein, a tube extending into said aperture and having its inner end of larger diameter than the portion normally adjacent the surface of the header, means for forming a fluid tight joint between said tube and header which is tightened by expansion of the tube by internal pressure, and means whereby said tube may be removed from said header in the direction parallel to the position of the tube when in use.

3. The combination of a header having an aperture therein, a tube extending into said aperture and having its inner end of larger diameter than the portion normally adjacent the surface of the header, means for forming a fluid tight joint between said tube and said header as the inner end of the tube is moved outwardly toward the surface of the header, and means whereby said tube may be removed from said header in the direction parallel to the position of the tube when in use.

4. The combination of a header having an inwardly flaring aperture and a tube having its end in said aperture and flared complementally to said aperture but of a size to pass through the small end of the aperture, a gasket between said flared surfaces and adapted to prevent withdrawal of the tube from the aperture, and means for moving said tube axially to clamp said gasket between said header and the end of the tube.

5. The combination as set forth in claim 4 together with means for forcing the tube axially to break the joint.

6. The combination with a header having an inwardly tapered threaded aperture, a threaded collar adapted to screw into said aperture, said collar having an inwardly flaring aperture therein, a tube within said collar and having its end flared complementally to the aperture in the collar, and means for moving said tube axially to wedge its end against the collar to form a fluid tight joint.

7. The combination as set forth in claim 6 and in which a preformed metal gasket separates the header from the collar.

REGINALD M. HARRIS.